United States Patent [19]

Parent et al.

[11] Patent Number: 4,780,286

[45] Date of Patent: Oct. 25, 1988

[54] INSECTICIDE DISPENSER CONTAINING EUTECTIC DISCONNECTOR

[75] Inventors: Donald G. Parent, South Windham, Me.; Wayne Boucher, Dayton, Ohio

[73] Assignee: GTE Products Corporation, Stamford, Conn.

[21] Appl. No.: 892,609

[22] Filed: Aug. 4, 1986

[51] Int. Cl.⁴ ............................................. A61L 9/02
[52] U.S. Cl. .................................... 422/125; 422/305; 422/306; 219/275; 219/517
[58] Field of Search ............... 422/123, 125, 126, 105, 422/305, 306; 219/275, 436, 438, 441, 442, 517; 337/409

[56] References Cited

U.S. PATENT DOCUMENTS

| | | |
|---|---|---|
| 1,508,035 | 9/1924 | Underwood .................. 422/105 |
| 2,154,803 | 4/1939 | Bancroft ....................... 422/126 |
| 2,881,303 | 4/1959 | Resk ............................. 219/517 |
| 3,727,164 | 4/1973 | Cartier et al. ................. 337/409 |
| 4,368,380 | 1/1983 | Igashira et al. .............. 219/275 |
| 4,576,798 | 3/1986 | Hall et al. .................... 422/105 |

Primary Examiner—Michael S. Marcus
Attorney, Agent, or Firm—James Theodosopoulos

[57] ABSTRACT

An insecticide dispenser capable of setting off a charge of insecticide to fumigate a room and then automatically shutting itself off before the completion of the dispensing of the charge of the insecticide, whereby the dispenser can be safely left unattended during the fumigation of a room. The dispenser includes a container for the insecticide and a fusible member that will break during the volatilization of the insecticide thereby to break the electrical circuit and turn off the power supply.

10 Claims, 2 Drawing Sheets

INSECTICIDE DISPENSER CONTAINING EUTECTIC DISCONNECTOR

FIELD OF THE INVENTION

The present invention relates to electrically heated insecticide dispensers for rooms and particularly to those which are adapted to disperse a charge of insecticide from a container which is to be used only once and in which the insecticide dispenser will shut itself off automatically when the charge has been dispensed.

SUMMARY OF THE PRIOR ART

Insecticide dispensers are well known to the art and devices have previously been introduced which are adapted to dispense insecticides into a room when a container is heated. For example, the U.S. Pat. No. 4,391,781, to van Lit, discloses a resistance heating device that can be utilized with a strip of paper that has been impregnated with an insecticide. The paper strip is urged against the resistance heater so that when the current is turned on, it will dispense the insecticide that is held on the paper. The paper is held against the resistance heating element by a clamp arm that presses the mat against the surface. A depressible lever engages the clamp arm and moves it away from the heating surface thereby releasing the paper strip to facilitate its replacement. In the van Lit patent, however, no disclosure is made of a container of insecticide and the limiting of the dispensing is controlled by the amount of vaporizable material that is held within the paper. No attempt is made in the van Lit patent to shut the resistance heating element off when the vaporizable material has been fully dispensed.

Since the present invention relates to dispensers for insecticides that utilize cannisters which are to be used only once, it is necessary to turn off the resistance heating element when the vaporizable material is fully dispersed into the room. The usual approach for dispensing such vaporizable material is to initiate the vaporization and then quickly leave the room where the dispenser has been disposed. The room is not reentered until quite a while later, when the vapor has settled and is not toxic to the person who is doing the fumigation. If the resistance heater were left on during the entire waiting period, a possibility exists that the dispenser could overheat and cause a fire while it is unattended. Thus, while the van Lit patent may be appropriate for dispensing certain small quantities of volatilizable material, we have found that it is inappropriate for large scale fumigation of entire rooms.

The U.S. Pat No. 4,202,472, to Lin, discloses the use of a device for bagging trash and simultaneously dispensing insecticides or repellents. The insecticide or repellent is slowly dispensed into the trash to prevent the breeding of micro-organisms. The device does not involve the use of electrical heating for the container and dispenser and thus is not adaptable for use for fumigating a room. The U.S. Pat. No. 4,316,279, to Beacham discloses a combined container and dispenser for dispensing a volatile product such as an air freshener or insecticide. The invention involves a continuous, low rate dispensing of the volatile product in an ambient atmosphere and is especially not related to the sudden volatilization of large quantities of insecticides such as are contemplated in the present invention. The invention of Beacham is designed to be unobtrusively stuck or hung to a hidden surface so that it is not normally observable by persons nearby whereby the vaporizable material will slowly disperse into the room where it is disposed.

Automated aerosol mist dispensers are disclosed in the U.S. Pat. No. 3,974,941 to Mettler. Patentee discloses a device for injecting short bursts of an atomized liquid such as air fresheners, medicines or insecticides at desired intervals from a spray nozzle in communication with a conventional aerosol can that contains a fluid under pressure. With Mettler's invention, an automated aerosol mist dispenser is disclosed that affords a secure interconnection between the pressurized can of fluid and the control valve mechanism and which is safe against undue leakage, even at relatively high temperatures owing to the provision of a balancing piston feature. No concept, however, is disclosed by Mettler for dispensing a large volume of insecticide into a room in a single charge through the use of a controlled resistance heating element.

U.S. Pat. No. 3,151,785 to Scarpa, and U.S. Pat. No. 3,466,789 to Kare, involve the use of liquid insecticide dispensers in which the rate of liquid that is being dispensed is controlled though slow dripping of the liquid and subsequent atmospheric volatilization. While Kare may disclose a single dose dispenser for the insecticide, no disclosure is made of electrically heating the dispenser to volatilize its contents.

SUMMARY OF THE INVENTION

According to the present invention, we have discovered an insecticide dispenser that can be electrically heated to dispense the insecticide and then shut itself off automatically. The dispenser includes an electrically conductive insecticide container that has a switching mechanism disposed on its bottom wall. The container is disposed on a resistance heater, preferably a PTC heater (as will be described later) that is made part of the circuit with the container. The switching mechanism includes an inverted cup that is sealed to the bottom wall of the container and is arranged to house a piston which is slidably disposed with one end extending through the bottom wall to contact a spring and with the other end being urged against a slug of eutectic metal which spaces the piston from the cup. Heating the container will initiate a self-sustaining exothermic chemical reaction which will eventually produce enough heat to melt the slug and allow the spring to urge the piston towards the top of the cup whereby the electrical circuit will be broken. The chemical reaction, however, is self-sustaining and will continue to dispense the insecticide, even though the external heat supply has been terminated. In the preferred embodiment, movement of the piston towards the cup will cause a pair of blades to separate, whereby the circuit will be broken.

When the insecticide is vaporized, the container cannot be used again, thereby preventing the possibility of injuring people through subsequent uses or with materials that are not designed for it. Moreover, the utilization of the dispenser of the present invention involves a person setting up the device and then turning on the power to commence the volatilization of the insecticide. When the heating has commenced, the fumigator promptly leaves the room in which the action has been initiated and closes the door, thereby containing the insecticide within the room and allowing it to do its work. The door is not opened for a significant amount of time so as to prevent poisoning the fumigator. Since it is undesirable to continue heating the container that holds the insecticide for all of the time the fumigator is out of the room because of the possibility of overheating or fire, the dispenser of the present invention is designed to turn itself off by breaking the electrical circuit thereby turning it off and eliminating these possibilities.

PTC heaters have been in use for many years. Such heaters offer several operating advantages over conventional resistance heating elements in the heating of containers of insecticides. They generally are flat and made from doped barium titinate ceramics which have a sharp positive temperature coefficient of resistance. The PTC ceramics are designed such that below a critical temperature, the resistance of the ceramic remains at low value and is essentially constant. When a particular temperature is reached, a crystalline phase change takes place in the ceramic and this abrupt change in crystal structure is accompanied by a sharp increase in the resistance at the crystalline grain boundaries. The result of this crystalline change is an increase in the heater resistance of several orders of magnitude over a very small temperature change. A barium titinate heater with a room temperature of resistance of 3.0 ohms will increase to 1000 ohms or more during the crystalling phase change. A temperature at which the crystalline phase change takes place can be adjusted in the PTC manufacturing process through the use of appropriate chemical additives and can be varied between 60 and 180 degrees centigrade.

When used as a heater and energized with a suitable voltage by applying current to the opposite side of it, the PTC ceramic rapidly heats up to a predetermined operating temperature and then "locks in" at this temperature. This rapid warm up is due to the initial low resistance of the PTC ceramic heater which results in an internal high power input of the heater. The "lock in" is due to the abrupt increase in resistance which causes generated power to be reduced until it equals dissipated power. At this point, a thermal equilibrium is achieved and the PTC heater self regulates itself at that temperature until it is turned off by the melting of the slug.

In the self regulating mode, the container will continue to be heated at the predetermined temperature which is sufficient to initiate the self-sustaining exothermic chemical reaction of the carrier and adequate to vaporize the insecticide. While the chemical reaction is underway, the fusible member will melt, thereby to break the circuit and prevent the container from overheating. A simple mechanism is provided for turning off the dispenser without someone being present.

DESCRIPTION OF THE PREFERRED EMBODIMENTS

Figure 1:
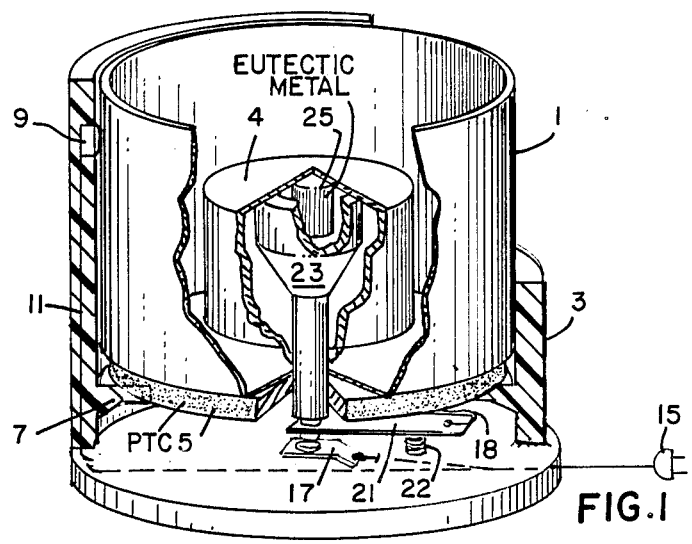
FIG. 1 is a perspective view, partially in cross section, of an embodiment of the dispenser of the present invention.

Referring now to the drawings, FIG. 1 illustrates an embodiment of the invention in which an electrically conductive insecticide container is snugly fitted in a housing 3. A PTC heater 5 is disposed on a support 7 which is formed on the inside of the side wall of the housing 3. An electrical contact button 9 is disposed on the side wall of the housing 3 and arranged to urge against the container 1 so as to make it one side of an electrical circuit. The side wall of the housing 3 is partially removed at a side opposite of the electrical contact button 9 so as to enable a user of the device to easily remove or insert a container 1 from the housing 3 as desired.

A lead-in wire 11 extends to the contact button 9 through the side wall and the base of housing 3 and runs external thereof to a plug 15. The lead-in wire 11 branches to electrically connect with a fixed blade 17 of an electrical switch assembly. A second blade 21, urged by spring 22, is movably attached at one end to the bottom wall of housing 3. Blade 21 swings about an axis of rotation centered at its attachment point to the housing 3. One side of blade 21 urges against fixed blade 17 and the other side urges against a piston 23. With this arrangement, the other side of the circuit is formed (when the dispenser is in a heating mode) between the blade 17, the blade 21, a connecting wire 18 and the base of the PTC heater 5. The slug of eutectic metal is urged against the inner wall of a cup 4 that is attached to the bottom wall of container 1. When the container 1 becomes sufficiently hot, the slug 25 of eutetic metal will melt and switch 21 will urge piston 23 upwardly thereby breaking the electrical circuit and shutting off the power supply to the PTC heater 5.

The particular eutetic metal used will depend upon the shut off temperature which is desired. Conventional 60-40 solder serves quite well for most applications and is readily available through commercial sources. Those skilled in the art will readily recognize the temperature requirements that are desired for a particular dispensing of insecticide and can adapt the eutetic metal to meet such requirements.

Figure 2:
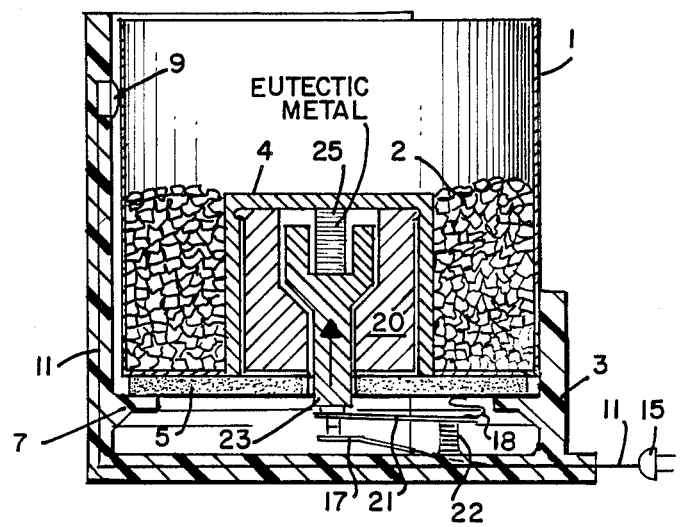
FIGS. 2 and 3 are side elevational views, partially in cross section of the dispenser shown in FIG. 1.
Figure 3:
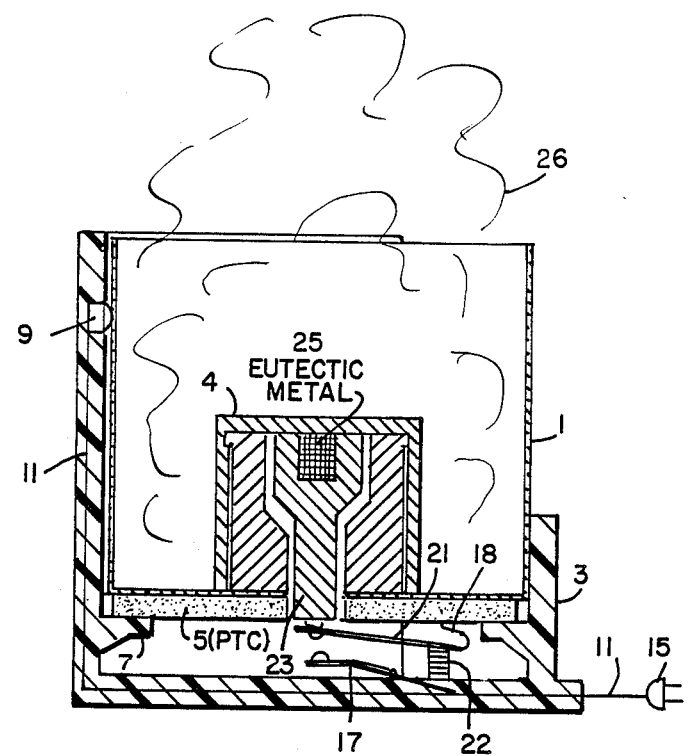

As shown in FIGS. 2 and 3, the mass of insecticide 2 is disposed above the cup 4. The mass of insecticide includes a conventional insecticide dispersed in well known chemical carriers. In the preferred embodiment, the carrier is such that it will chemically react in an exothermic chemical reaction upon the application of heat from the PTC heater 5. The chemical reaction, as it well known, is self-sustaining upon initiation and the heat from the exothermic reaction will vaporize the insecticide to disperse it into the room. As mentioned above, cup 4 is attached to the bottom wall of a container 1 and forms an integral part thereof. The piston 23 is urged upwardly by spring 22 that is disposed upon the floor of housing 3. When the slug of eutetic metal 25 melts, the piston 23 will move upwardly toward the top of cup 4 under the urging of spring 22. When spring 22 urges piston 23 upwardly, the circuit formed through fixed blade 17 and movable blade 21 will break, thereby preventing current from flowing to PTC heater 5 through connecting wire 18 and thereby shutting off PTC heater 5. Preferably, piston 23 is seated in a channel 20 that is securely disposed within cup 4.

As can be clearly seen in this Figure, one end of lead-in wire 11 extends from the base of housing 3 to a plug 15 and the other end to blade 17 and contact button 9 respectively.

FIG. 3 is a view of the dispenser after the insecticide has been vaporized into a cloud 26. Slug 25 has melted into a mass that can fill a cavity in the top of piston 23. Spring 22 has urged blade 21 upwardly thus forcing piston 23 towards the top of cup 4 and breaking the electrical circuit between blade 17 and blade 21. Current no longer flows through connection 18 to PTC heater 5. The termination of the heating due to the vaporization of the insecticide and the reaction of the carrier in which it is disposed has melted slug 25. Melting slug 25 breaks the circuit without any intervention on the part of the fumigator. The fumigator can safely plug the dispenser into the wall, leave the room unattended with the security of knowledge that the dispenser will turn off automatically at the expiry of the chemical reaction that dispenses the insecticide into the room. Fear of overheating and fire can be eliminated.

It is apparent that changes and modifications can be made within the spirit and scope of the present invention. It is our intention, however, only to be limited by the scope of the appended claims.

As our invention we claim:

1. An insecticide dispenser adapted to dispense a single charge of an insecticide into a room and shut itself off when the charge is dispensed, said dispenser comprising:
   a housing and a PTC heater disposed on a support in said housing;
   an electrically conductive container disposed on said PTC heater, said container being in electrical contact with said PTC heater;
   a charge of combustible material including a vaporizable insecticide disposed in said container, said charge being capable of self-sustaining combustion after ignition;
   a movable piston operatively associated with said container and a eutectic metal temperature sensing means disposed between said piston and said container, whereby to sense the temperature of said container;
   means urging said piston against said eutectic metal sensing means and thus urging said eutectic metal against said container;
   switch means electrically associated with said piston, said switch means being disposed so that when said piston is separated from said container by said eutectic metal temperature sensing means, current passes to said PTC heater to provide heat which will initiate combustion, and when said eutectic metal temperature sensing means melts, to allow movement of said piston, whereby current will stop passing to said PTC heater thereby turning it off.

2. The dispenser according to claim 1 wherein the container has a flat bottom, said PTC heater is flat in shape and said flat bottom is positioned and arranged thereupon.

3. The dispenser according to claim 1 wherein said piston is disposed through an aperture in said PTC heater means.

4. The dispenser according to claim 1 further including means forming an annular area within said container for the disposition of said charge of insecticide, whereby when said charge is ignited, the heat will melt said eutectic metal temperature sensing means at a predetermined temperature.

5. The dispenser according to claim 1 or 4 wherein said piston has a cavity disposed on its upper surface, positioned and arranged to hold said eutectic metal means when solid and receive the eutectic metal when it melts.

6. The dispenser according to claim 1 or 4 wherein said piston is movable along it axis and guided by a channel means.

7. The dispenser according to claim 4 wherein said piston is slidably arranged in an aperture in said PTC heater.

8. The dispenser according to claim 7 wherein said piston has a cavity disposed on its upper end and configured to retain said eutectic metal sensing means when solid and receive the molten eutectic metal when it melts.

9. The dispenser according to claim 8 wherein said piston is movable along its axis and guided by a channel means.

10. An insecticide dispenser adapted to dispense a single charge of an insecticide into a room and shut itself off when the charge is dispensed, said dispenser comprising:
    a two-sided PTC heater disposed within said dispenser;
    an electrically conductive container connected to one side of a two-sided power supply, said container being disposed in electrical contact with one side of said PTC heater, said container also being disposed to receive heat from said PTC heater;
    a charge of combustible material including an insecticide disposed within said electrically conductive container;
    a movable piston having an inner end and an outer end, said inner end being disposed to urge towards said container;
    a eutectic metal temperature sensing means having a predetermined melting point disposed on the inner end of said piston and spacing said piston from container;
    means urging the outer end of said piston towards said eutectic metal temperature sensing means;
    means electrically connecting said PTC heater to the other side of said PTC heater, the electric connection including said urging means, and disposed so that when the eutectic metal is in the solid state, the connection is complete and will conduct electricity to the PTC heater but will break when said eutectic metal melts, whereby said PTC heater will be turned off.

* * * * *